United States Patent [19]

Brady et al.

[11] Patent Number: 5,196,553
[45] Date of Patent: Mar. 23, 1993

[54] PREPARATION PROCESS FOR AMINOANTHRAQUINONE DERIVATIVES

[75] Inventors: John H. Brady, Tottington; Peter J. Brogden, Shotton; Malcolm B. Nield, Mossley, all of England

[73] Assignee: Ciba-Geigy Corporation, Ardsley, N.Y.

[21] Appl. No.: 720,549

[22] Filed: Jun. 25, 1991

[30] Foreign Application Priority Data

Jun. 26, 1990 [GB] United Kingdom ............... 9014234

[51] Int. Cl.$^5$ .................. C07C 303/30; C07C 307/02
[52] U.S. Cl. ................................ 552/225; 552/228
[58] Field of Search ........................... 552/225

[56] References Cited

U.S. PATENT DOCUMENTS

| 2,329,809 | 10/1940 | Wuertz et al. | 260/374 |
| 4,510,087 | 4/1985 | Hattori et al. | 552/225 |
| 4,521,341 | 6/1985 | Kröck et al. | 552/225 |

FOREIGN PATENT DOCUMENTS

| 0209284 | 1/1987 | European Pat. Off. . |
| 1140998 | 1/1969 | United Kingdom . |

OTHER PUBLICATIONS

CA 112(13):118010n (1990).
CA 100(26):211655p (1990).

Primary Examiner—Alan L. Rotman
Assistant Examiner—Raymond Covington
Attorney, Agent, or Firm—Kevin T. Mansfield; Edward McC. Roberts

[57] ABSTRACT

A process for the preparation of aminoanthraquinone derivatives comprises reacting (A) bromaminic acid or a metal salt thereof with (B) an amine or amide in an aqueous alkaline medium in the presence of a copper (I) salt formed by in situ reduction of a copper (II) salt.

18 Claims, No Drawings

PREPARATION PROCESS FOR AMINOANTHRAQUINONE DERIVATIVES

This invention relates to a process for the preparation of aminoanthraquinone derivatives by reaction of halogen-substituted anthraquinones, particularly bromaminic acid (1-amino-4-bromo-anthraquinone-2-sulphonic acid) and its metal salts, with amines or amides.

In the manufacture of various dyestuffs, bromaminic acid or its metal salts are reacted with amines or amides, particularly aromatic sulphonamides, to replace the bromine atom by a substituted amino group with the elimination of HBr. The reaction is carried out in aqueous alkali in the presence of a copper (I) catalyst, usually cuprous chloride. The copper (I) catalyst has to be used in substantial amounts for effective reaction in commercial processes, 0.2 mol of cuprous chloride per mol of bromaminic acid or salt being commonly used.

The reaction product is then heated with methanol and aqueous sodium hydroxide to displace the sulphonic salt group by a methoxy group. The resulting product - a disperse dye which may be used as such or subjected to further reactions to form other dyes - is filtered off for further processing and the filtrate is discharged as effluent. Most of the copper catalyst is discharged in the effluent at this stage in amounts which are becoming increasingly unacceptable environmentally. There is, therefore a need for a manufacturing process in which the amount of copper discharged in effluent is reduced. Furthermore, although most of the copper catalyst is removed in the abovementioned filtrate, a substantial amount remains in the solid product filtered off and is present in the disperse dye when it is eventually used in a dyeing process. Consequently, effluent from the dyeing process also contains a substantial amount of copper. A process which reduces the residual level of copper in the disperse dye is thus also required.

It has now been found that by carrying out the reaction between the bromaminic acid or salt and the amine or amide in the presence, as catalyst, of a copper (I) species formed by in situ reaction of a copper (II) salt and a reducing agent therefor, only very small amounts of copper are required for effective reaction and effluents containing waste products from the reaction mixture and subsequent reactions contain only very low levels of copper. Dyestuff end products also contain very low levels of copper.

Accordingly, the present invention provides a process for the preparation of aminoanthraquinone derivatives which comprises reacting (A) bromaminic acid or metal salt thereof with (B) an aromatic sulphonamide having at least one reactive hydrogen atom attached to nitrogen or an amine having only one primary amine group in an aqueous medium in the presence of a copper (II) salt and an organic reducing agent therefor, the molar ratio of copper (II) salt to (A) being less than 0.05:1.

A particularly effective reaction between (A) and (B) can be obtained by heating them together with a copper (II) salt and an organic reducing agent therefor.

In the process of the invention, bromaminic acid may be used as such or as a metal salt thereof. Preferably (A) is an alkali metal salt, especially the sodium salt, of bromaminic acid.

Where (B) is an amine, it may be an aromatic or cycloaliphatic amine having only one primary amine group. Suitable amines include aniline; C-alkyl substituted anilines such as o-toluidine, m-toluidine, p-toluidine, o-xylidines, m-xylidines, p-xylidine and mesidine; C-acylamino substituted anilines such as 4-aminoacetanilide, 4-amino-N-methyl-acetanilide, 4-amino-N-ethylacetanilide, 4-propionamidoaniline (4-aminopropionanilide), 3-propionamidoaniline, 4-amino-N-methylpropionanilide and 4-amino-n-butyranilide; $C_6$-$C_9$ cycloaliphatic amines such as cyclohexylamine and 2-methylcyclohexylamine; and anilines which are substituted by an alkylaminosulphonyl group such as 5-amino-N-(2-hydroxyethyl)-2,3,-dimethylbenzenesulphon amide. Especially preferred amongst the abovementioned amines for uses as (B) are aniline, mesidine, 4-aminoacetanilide, 4-amino-N-methylacetanilide, 4-propionamidoaniline, 3-propionamidoaniline and 5-amino-1,2-dimethyl-3-sulfo-2'-hydroxyethylphonamide.

When (B) is an amide, it is preferably an aromatic sulphonamide, especially benzenesulphonamide or an alkylbenzenesulphonamide such as p-toluenesulphonamide, an hydroxynitrobenzenesulphonamide, chloronitrobenzenesulphonamide or aminonitrobenzenesulphonamide.

The copper (II) salt used in the process of the invention may be a salt of an organic acid, such as copper (II) formate or copper (II) acetate, or a salt of an inorganic acid, such as copper (II) sulphate or copper (II) nitrate. Copper (II) sulphate is especially preferred for use as the copper (II) salt.

Organic reducing agents for the copper (II) salt include aldehydes such as formaldehyde, acetaldehyde and aldehyde group - containing sugars, i.e. aldoses, hydroxylamine, and hydrazines such as hydrazine itself and phenylhydrazine. Preferred reducing agents include aldoses, which may be monosaccharides such as glucose, mannose or galactose or polysaccharides such as lactose and maltose. Especially preferred reducing agents are glucose and lactose.

The reactants (A) and (B) are usually reacted in substantially stoichiometric amounts. The molar ratio of copper (II) salt to the bromaminic acid or salt thereof (A) is less than 0.05:1; this molar ratio is preferably from 0.001:1 to 0.01:1, especially from 0.004:1 to 0.007:1. The molar ratio of reducing agent to copper (II) salt may be from 5:1 to 50:1, preferably from 5:1 to 30:1 and especially from 10:1 to 20:1.

The reaction between (A) and (B) may be carried out at temperatures between 50° C. and reflux temperature. Preferred reaction temperatures are from 65° C. to 75° C. Reaction is generally complete within 2 to 7 hours.

The aqueous alkaline medium in which the reaction is carried out may be aqueous solution of a hydroxide, carbonate or bicarbonate of an alkali metal, preferably sodium. A mixture of sodium carbonate and sodium bicarbonate is particularly suitable. The alkali content of the aqueous alkaline medium may be adjusted to give a pH of 8 to 13, preferably 8 to 10, especially 8.5 to 9.

In carrying out the process of the invention, the usual procedure comprises forming a mixture of the reactants (A) and (B) in water and adding the copper (II) salt and the reducing agent to this mixture at ambient temperature. The alkali may be added before or after the addition of the copper salt and reducing agent. After heating at the reaction temperature for the required time, the reaction mixture is diluted with water and cooled to 40° C. or below. The solid product is filtered off and washed with an aqueous sodium chloride solution. In accordance with the invention, the filtrate and the washing contain only very small amounts of copper. The reaction product of (A) and (B) may be heated with methanol and an alkali, usually sodium hydroxide, using conventional procedures, e.g. at temperatures between 80° C. and reflux temperature, to displace the sulphonic acid or salt group by a methoxy group, forming a dyestuff or a dyestuff precursor. The substituted amino group in the 4-position on the anthraquinone ring system may then be cleaved by reaction with an acid to give 1,4-diamino-2-methoxyanthraquinone.

The reaction product of (A) bromaminic acid or a salt thereof and (B) the amine or amide may usually be represented by the formula

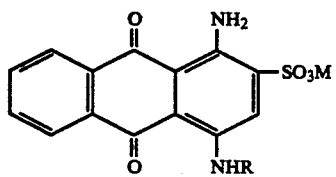
I where M denotes H or a metal, preferably sodium, and R denotes the residue of the amine or amide after removal of the reactive hydrogen atom therefrom. On displacement of the -SO$_3$M group by methoxy as hereinbefore described, the product obtained is of formula

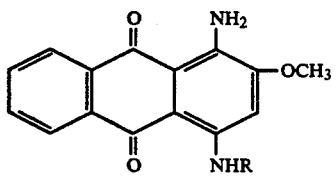
II where R is as hereinbefore defined.

When R denotes a group of formula

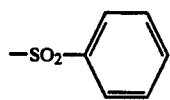
III i.e. where the compound of formula I is a reaction product of bromaminic acid and benzenesulphonamide, the compound of formula II obtained is a disperse dye used as a component of Colour Index Disperse Red 86.1.

When R denotes a group of formula

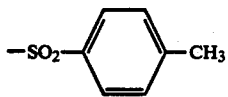
IV the compound of formula II is the disperse dye Colour Index Disperse Red 86, also used as a component of CI Disperse Red 86.1.

Cleavage of the arylsulphonyl group in either of the above products by reaction with an acid, usually sulphuric acid, gives 1,4-diamino-2-methoxyanthraquinone, the disperse dye CI Disperse Red 11.

Reaction products of bromaminic acid and an amine or amide obtained by the process of the invention, and dyestuffs obtained therefrom, contain only very small amounts of residual copper.

The invention is illustrated by the following Examples.

EXAMPLE 1

Copper (II) sulphate pentahydrate (0.16 g, 0.00064 mol) and glucose monohydrate (1.6 g, 0.008 mol) are added to a mixture of bromaminic acid sodium salt (38.2 g, 0.1 mol) and benzenesulphonamide 17.3 g, 0.11 mol) in water (250 ml) containing sodium carbonate (3.8 g) and sodium bicarbonate (19.0 g). The mixture which has a pH of 8.5–9, is heated to 70° C. and stirred at this temperature for 5 hours. The resulting mixture is diluted with water to a volume of 750 ml and cooled to 40° C. The solid product is filtered off and washed with a solution of sodium chloride (12 g) in water (1300 ml) to give 89.1 g (99% yield) of 1-amino-4-phenylsulphonylamido-anthraquinone-2-sulphonic acid sodium salt - a product of formula I where M denotes sodium and R denotes a group of formula III. Analysis shows that the filtrate and washing liquid contain only 0.0046 mol of copper per mol of bromaminic salt reactant. Part of the solid product (24.8 g, 0.054 mol) is added to a solution of sodium hydroxide (62 g, 1.55 mol) in methanol (200 ml). The mixture is heated under reflux for 10 hours, diluted with water to a total volume of 900 ml at 70° C. 98% sulphuric acid is added to reduce the pH to 6.0–7.0 and the mixture is heated at 70° C.–75° C. for 30 minutes. The solid product obtained is filtered off, and washed with water at 40° C. (1000 ml) to give a substantially quantitative yield of 1-amino-4-phenylsulphonylamido-2-methoxyanthraquinone - a product of formula II where R is a phenylsulphonyl group. Analysis shows that the filtrate and washings contain only 0.0012 mol of copper per mol of bromaminic salt starting material, while the product contains only 0.0006 mol of copper per mol of bromaminic salt.

EXAMPLE 2

Copper (II) sulphate pentahydrate (0.122 g, 0.0005 mol) and glucose monohydrate (1.6 g, 0.008 mol) are added to a mixture of bromaminic acid sodium salt (38.2 g, 0.1 mol) and p-toluenesulphonamide (18.8 g, 0.11 mol) in water (250 ml) containing sodium carbonate (3.8 g) and sodium bicarbonate (19.0 g). The mixture which has a pH of 8.5–9, is heated to 70° C. and stirred at this temperature for 5 hours. The resulting mixture is diluted with water to a volume of 750 ml and cooled to 40° C. The solid product is filtered off and washed with a solution of sodium chloride (12 g) in water (1300 ml) to give a 99% yield of 1-amino-4-(4'-methylphenylsulphonamido)-anthraquinone-2-sulphonic acid sodium salt - a product of formula I where M denotes sodium and R denotes a group of formula IV. Analysis shows that the filtrate and washing liquid contain only 0.0025 mol of copper per mol of bromaminic salt starting material. Part of the solid product (25.5 g, 0.054 mol) is added to a solution of sodium hydroxide (62 g, 1.55 mol) in methanol (200 ml). The mixture is heated under reflux for 10 hours, then diluted with water to a volume of 900 ml at 70° C. 98% sulphuric acid is added to reduce the pH of the mixture to 6.0–7.0 and the mixture is heated at 70° C.–75° C. for 30 minutes. The solid product obtained is filtered off and washed with water at 40° C. (1000 ml) to give a substantially quantitative yield of 1-amino-4-(4'-methylphenylsulphonamido)-2-methoxyanthraquinone (C.I. Disperse Red 86). Analysis shows that the filtrate and washings contain only 0.0015 mol of copper per mol of bromaminic salt, while the product contains only 0.001 mol of copper per mol of bromaminic salt.

EXAMPLE 3

Copper (II) acetate monohydrate (0.13 g, 0.00064 mol) and glucose monohydrate (1.6 g, 0.008 mol) are added to a mixture of bromaminic acid sodium salt (38.2 g, 0.1 mol) and p-toluenesulphonamide (18.8 g 0.11 mol) in water (250 mol) containing sodium carbonate (3.8 g) and sodium bicarbonate (19.0 g). The mixture which has a pH of 8.5–9.0, is heated to 70° C. and stirred at this temperature for five hours. The resulting mixture is diluted to a volume of 750 ml with water and cooled to 40° C. The solid product is filtered off and washed with a solution of sodium chloride (12 g) in water (1300 ml) to give a 97% yield 1-amino-4-(4'-methlylphenylsulphonamido)-anthraquinone-2-sulphonic acid sodium salt, a product of formula I where M denotes sodium and R denotes a group of formula IV.

EXAMPLE 4

Copper (II) sulphate pentahydrate (0.16 g, 0.00064 mol) and lactose monohydrate (2.9 g, 0.008 mol) are added to a mixture of bromaminic acid sodium salt (38.2 g, 0.1 mol) and benzene sulphonamide (17.3 g, 0.11 mol) in water (250 ml) containing sodium carbonate (3.8 g) and sodium bicarbonate (19.0 g). The mixture which has a pH of 8.5–9.0, is heated to 70° C. and stirred at this temperature for 5 hours. The resulting mixture is diluted with water to a volume of 750 ml and cooled to 40° C. The solid product is filtered off and washed with a solution of sodium chloride (12 g) in water (1300 ml) to give a 95% yield of 1-amino-4-phenylsulphonamido-anthraquinone-2-sulphonic acid sodium salt, a product of formula I where M denotes sodium and R denotes a group of formula III.

EXAMPLE 5

Copper (II) sulphate pentahydrate (0.48 g, 0.0018 mol) and glucose monohydrate 4.8 g, 0.024 mol) are added to a mixture of bromaminic acid sodium salt (38.2 g, 0.1 mol) and 2-aminophenyol-4-sulphonamide (20.7 g, 0.11 mol) in water (250 ml) containing sodium carbonate (3.8 g) and sodium bicarbonate (19.0 g). The mixture which has a pH of 8.5–9.0, is heated to 70° C. and stirred at this temperature for 12 hours. The resulting mixture is diluted with water to 750 ml and cooled to 40° C. Sodium chloride (100 g) is added to the mixture and cooled further to 20° C. The solid product is filtered off and washed with a solution of sodium chloride (100 g) in water (1000 ml) to give 34% yield of 1-amino-4-(3'-amino-4'-hydroxyphenylsulphonamido)-anthraquinone-2-sulphonic acid sodium salt, a product of formula I where M denotes sodium and R denotes a group of formula V.

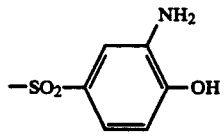

V

EXAMPLE 6

Copper (II) sulphate pentahydrate (0.122 g, 0.0005 mol) and hydroxylamine hydrochloride (1.12 g, 0.016 mol) are added to a mixture of bromaminic acid sodium salt (38.2 g, 0.1 mol) and p-toluene sulphonamide (18.8 g, 0.11 mol) in water (250 ml) containing sodium carbonate (3.8 g) and sodium bicarbonate (19.0 g). The mixture which has a pH of 8.5–9.0, is heated to 70° C. for 6 hours. The resulting mixture is diluted with water to a volume of 750 ml and cooled to 40° C. The solid product is filtered off and washed with a solution of sodium chloride (12 g) in water (1300 ml) to give a 94% yield of 1-amino-4-(4'-methylphenylsulphonamido)-anthraquinone-2-sulphonic acid sodium salt, a product of formula I where M denotes sodium and R denotes a group of formula IV.

EXAMPLE 7 TO 9

In an analogous manner as described in Examples 1 to 6 the dyes of formula I are obtained where M denotes sodium and R denotes the groups given in the following table:

| Example | R | |
|---|---|---|
| 7 | ⟨phenyl⟩–NH–C(=O)–C₂H₅ | VI |
| 8 | ⟨2,4-dimethylphenyl⟩–SO₂–NH–CH₂–CH₂–OH (with CH₃ groups) | VII |
| 9 | ⟨phenyl⟩–NH–C(=O)–C₂H₅ (para) | VIII |

We claim:

1. A process for the preparation of aminoanthraquinone derivatives which comprises reacting (A) bromaminic acid or a metal salt thereof with (B) an aromatic sulphonamide having at least one reactive hydrogen atom attached to nitrogen or an amine having only one primary amine group in an aqueous medium in the presence of a copper (II) salt and an organic reducing agent therefor, the molar ratio of copper (II) salt to (A) being less than 0.05:1.

2. A process according to claim 1, in which (A) is an alkali metal salt of bromaminic acid.

3. A process according to claim 2, in which (A) is the sodium salt of bromaminic acid.

4. A process according to claim 1, in which (B) is benzenesulphonamide or an alkylbenzene sulphonamide.

5. A process according to claim 1, in which the copper (II) salt is copper (II) sulphate.

6. A process according to claim 1, in which the organic reducing agent is an aldehyde group-containing sugar.

7. A process according to claim 1, in which the molar ratio of copper (II) salt to bromaminic acid is from 0.001:1 to 0.01:1.

8. A process according to claim 1, in which the molar ratio of reducing agent to copper (II) salt is from 5:1 to 50:1.

9. A process according to claim 1, which is carried out a temperature between 50° C. and reflux temperature.

10. A process according to claim 1, in which the aqueous alkaline medium has a pH of 8 to 10.

11. A process according to claim 1, in which the reaction product of (A) and (B) is heated with methanol and an alkali to displace the sulphonic acid or salt group by a methoxy group.

12. A process according to claim 11, in which the product of the displacement is reacted with an acid to form 1,4-diamino-2-methoxyanthraquinone.

13. A process according to claim 6, in which the organic reducing agent is glucose or lactose.

14. A process according to claim 7, in which the molar ratio of copper (II) salt to bromaminic acid is from 0.004:1 to 0.007:1.

15. A process according to claim 8, in which the molar ratio of reducing agent to copper (II) salt is from 5:1 to 30:1.

16. A process according to claim 8, in which the molar ratio of reducing agent to copper (II) salt is from 10:1 to 20:1.

17. A process according to claim 9, which is carried out at a temperature between 65° C. and 75° C.

18. A process according to claim 10, in which the aqueous alkaline medium has a pH of 8.5 to 9.

* * * * *